US012395478B2

(12) United States Patent
Goel et al.

(10) Patent No.: US 12,395,478 B2
(45) Date of Patent: Aug. 19, 2025

(54) AUTHENTICATION SYSTEM FOR CLOUD INFRASTRUCTURE USING KEYS DERIVED FROM DEVICE COMPONENT INFORMATION

(71) Applicant: Dell Products L.P., Round Rock, TX (US)

(72) Inventors: Naman Goel, Bangalore (IN); Shivendra Katiyar, Bangalore (IN); Rishi Mukherjee, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 18/325,245

(22) Filed: May 30, 2023

(65) Prior Publication Data

US 2024/0406155 A1 Dec. 5, 2024

(51) Int. Cl.
*H04L 9/40* (2022.01)
*H04L 67/56* (2022.01)

(52) U.S. Cl.
CPC ........ *H04L 63/062* (2013.01); *H04L 63/0435* (2013.01); *H04L 67/56* (2022.05)

(58) Field of Classification Search
CPC ........... H04L 2463/082; H04L 63/0281; H04L 63/0435; H04L 63/062; H04L 67/56
See application file for complete search history.

(56) References Cited

U.S. PATENT DOCUMENTS

| | | | |
|---|---|---|---|
| 9,210,051 B2 | 12/2015 | Kruglick | |
| 9,503,452 B1 | 11/2016 | Kumar et al. | |
| 9,906,366 B1 * | 2/2018 | Maria | H04L 63/0861 |
| 10,122,709 B2 | 11/2018 | Momchilov et al. | |
| 11,777,922 B2 | 10/2023 | Katiyar et al. | |
| 2006/0075103 A1 | 4/2006 | Cromer et al. | |
| 2009/0292641 A1 | 11/2009 | Weiss | |
| 2013/0138961 A1 | 5/2013 | Tsuji et al. | |
| 2014/0380445 A1 | 12/2014 | Tunnell et al. | |
| 2016/0086176 A1 | 3/2016 | Silva Pinto et al. | |
| 2016/0165650 A1 * | 6/2016 | Kim | H04W 12/06 370/329 |

(Continued)

OTHER PUBLICATIONS

A. Ometov et al., "Multi-Factor Authentication: A Survey," Cryptography, vol. 2, No. 1, 2018, 31 pages.

(Continued)

*Primary Examiner* — Gil H. Lee
(74) *Attorney, Agent, or Firm* — Ryan, Mason & Lewis, LLP

(57) ABSTRACT

An apparatus in an illustrative embodiment comprises at least one processing device including a processor coupled to a memory. The at least one processing device is configured to identify a plurality of components of a first network device, to generate at least one fingerprint based at least in part on the identified plurality of components of the first network device, to encrypt the at least one fingerprint, to generate at least one packet containing at least the encrypted at least one fingerprint, to send the at least one packet to at least a second network device, and to interact with the second network device to obtain at least one key derived at least in part from the at least one fingerprint. The at least one key is utilized in an authentication process carried out between the first network device and the second network device.

20 Claims, 11 Drawing Sheets

(56) References Cited

U.S. PATENT DOCUMENTS

| | | | |
|---|---|---|---|
| 2017/0126661 | A1 | 5/2017 | Brannon |
| 2018/0159942 | A1 | 6/2018 | Chen et al. |
| 2020/0244647 | A1 | 7/2020 | Liu et al. |
| 2021/0328874 | A1 | 10/2021 | Jacobson et al. |
| 2021/0336772 | A1 | 10/2021 | Debata et al. |
| 2022/0200999 | A1* | 6/2022 | Huang ............... H04L 9/30 |
| 2023/0110856 | A1 | 4/2023 | Katiyar et al. |
| 2023/0116820 | A1 | 4/2023 | Banerjee et al. |
| 2024/0354850 | A1* | 10/2024 | Saunkeah ............ G06Q 40/04 |

OTHER PUBLICATIONS

Wikipedia, "Mulit-factor Authentication," https://en.wikipedia.org/wiki/Multi-factor_authentication, Sep. 5, 2021, 12 pages.

Averon, "Seamless MFA," https://averon.a2hosted.com/seamless-mfa/, Accessed Oct. 12, 2021, 7 pages.

M. D. Corner et al., "Zero-Interaction Authentication," Proceedings of the 8th Annual International Conference on Mobile Computing and Networking, Sep. 23-28, 2002, 11 pages.

Wikipedia, "Link Layer Discovery Protocol," https://en.wikipedia.org/wiki/Link_Layer_Discovery_Protocol, Jun. 14, 2022, 4 pages.

IEEE Standards Association, "IEEE Standard for Local and Metropolitan Area Networks—Station and Media Access Control Connectivity Discovery," IEEE Std 802.1AB-2016, Jan. 29, 2016, 146 pages.

U.S. Appl. No. 18/094,442 filed in the name of Naman Goel et al. on Jan. 9, 2023, and entitled "Secure and Dynamic Assignment of Network Addresses to Network Devices in an Information Processing System."

Fido Alliance, "Device Onboarding," https://web.archive.org/web/20231003101358/https://fidoalliance.org/device-onboarding/, Accessed Mar. 19, 2024, 3 pages.

Cisco Systems Inc., "Configuring DHCP Snooping," Cisco Nexus 7000 Series NX-OS Security Configuration Guide, Release 4.1, Chapter 15, https://www.cisco.com/c/en/us/td/docs/switches/datacenter/sw/4_1/nx-os/security/configuration/guide/sec_nx-os-cfg/sec_dhcpsnoop.html, Accessed Oct. 5, 2022, 20 pages.

Juniper Networks, Inc., "Understanding and Using Trusted DHCP Servers," https://www.juniper.net/documentation/us/en/software/junos/security-services/topics/topic-map/port-security-trusted-dhcp-server.html, Feb. 18, 2021, 6 pages.

R. Droms, "Dynamic Host Configuration Protocol," https://datatracker.ietf.org/doc/html/rfc2131, Network Working Group, Request for Comments: 2131, Mar. 1997, 45 pages.

Wikipedia, "Dynamic Host Configuration Protocol," https://en.wikipedia.org/wiki/Dynamic_Host_Configuration_Protocol, Dec. 29, 2022, 25 pages.

U.S. Appl. No. 18/422,275 filed in the name of Shivendra Katiyar et al. on Jan. 25, 2024, and entitled "Cross-Vendor Device Authentication for Multi-Vendor Infrastructure."

* cited by examiner

AUTHENTICATION SYSTEM FOR CLOUD INFRASTRUCTURE USING KEYS DERIVED FROM DEVICE COMPONENT INFORMATION

FIELD

The field relates generally to information processing systems, and more particularly to authentication techniques in computer networks and other types of information processing systems.

BACKGROUND

In numerous cloud infrastructure deployments, including cloud and edge infrastructure arrangements, and in a wide variety of other computer network contexts, security is particularly important. For example, cloud infrastructure arrangements typically include multiple distinct infrastructure resources, such as compute nodes, storage nodes, network switches and/or other types of network devices, at least some of which may be from the same infrastructure vendor. Such infrastructure resources can each have an associated management module. In the case of hyperconverged infrastructure (HCI), multiple infrastructure resources interact with one another for management purposes, and are additionally connected to a centralized management module, illustratively provided by a cloud vendor or other infrastructure vendor. These and other similar cloud infrastructure arrangements often require that passwords or other credentials for the various management modules of the infrastructure resources are also stored in the centralized management module. Such centralized storage presents significant security issues, such as an enhanced risk of credential compromise. In addition, changes in credentials as well as configuration changes such as addition or deletion of nodes, network switches or other network devices can require tedious processes that may include manual intervention by one or more administrators. A need therefore exists for improved authentication techniques that can avoid the above-noted security issues and other drawbacks of conventional practice.

SUMMARY

Illustrative embodiments provide techniques for authentication in a computer network, such as cloud infrastructure, cluster infrastructure or other deployments of information technology (IT) infrastructure, where keys are derived at least in part from device component information of respective nodes, network switches or other types of network devices. In some embodiments, the disclosed techniques advantageously avoid the above-noted security issues and other drawbacks associated with centralized storage of passwords or other credentials for network devices of cloud infrastructure.

In one or more embodiments, authentication using keys derived from device component information is implemented at least in part using device component fingerprints and other types of device component information that is exchanged between nodes, network switches and other network devices, illustratively using Link Layer Discovery Protocol (LLDP) packets, although other types of packets could be used.

Some embodiments incorporate nodes or other devices that include one or more instances of a baseboard management controller (BMC), as well as other types of devices such as one or more network switches, although it is to be appreciated that additional or alternative devices can be used in other embodiments. Such nodes, network switches and/or other devices are generally referred to herein as "network devices."

In an illustrative embodiment, an apparatus comprises at least one processing device that includes a processor coupled to a memory, with the at least one processing device being configured to identify a plurality of components of a first network device, to generate at least one fingerprint based at least in part on the identified plurality of components of the first network device, to encrypt the at least one fingerprint, to generate at least one packet containing at least the encrypted at least one fingerprint, to send the at least one packet to at least a second network device, and to interact with the second network device to obtain at least one key derived at least in part from the at least one fingerprint. The at least one key is utilized in an authentication process carried out between the first network device and the second network device.

These and other illustrative embodiments include, without limitation, systems, apparatus, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
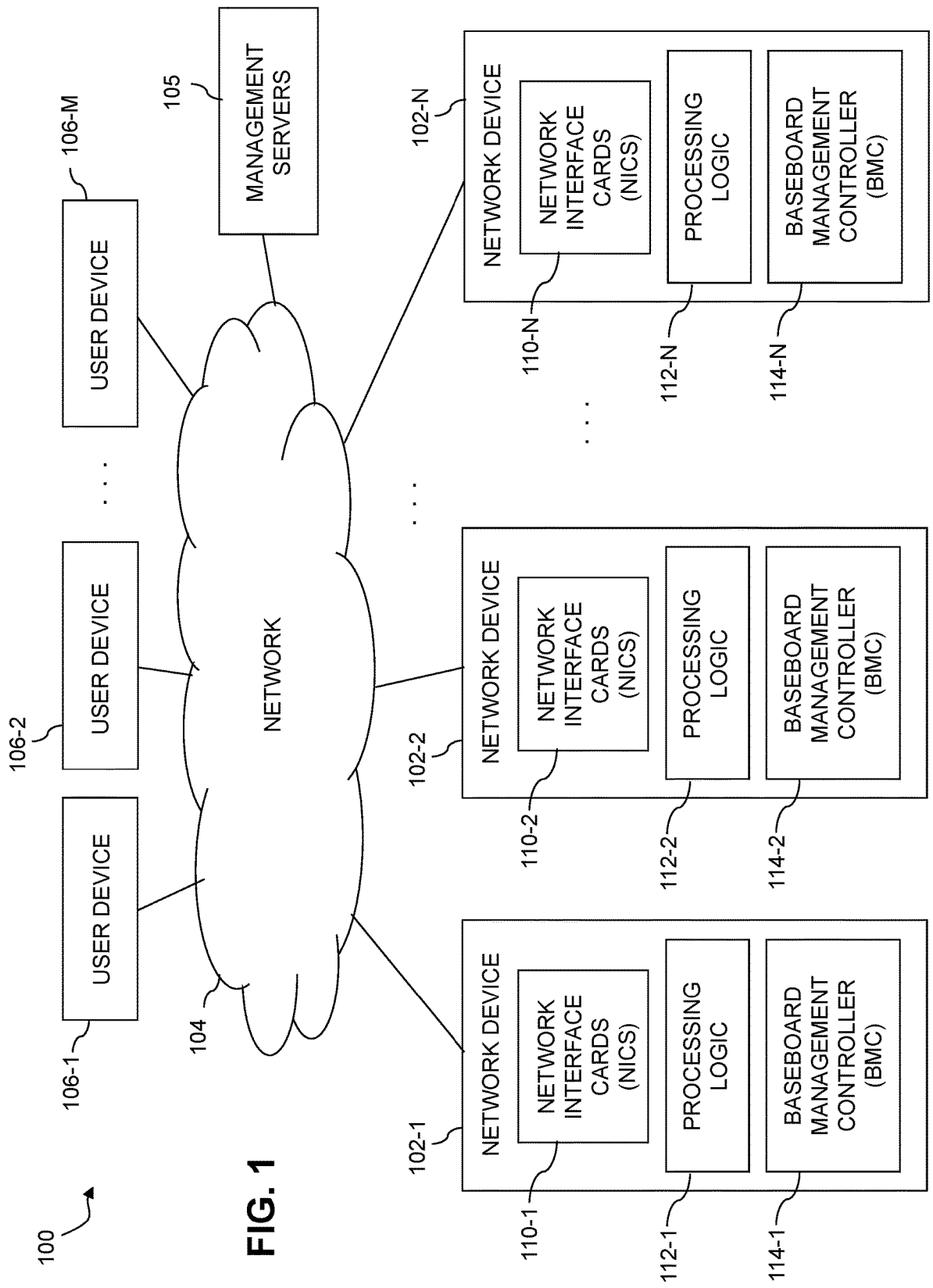
FIG. 1 is a block diagram of an example information processing system implementing authentication using keys derived from device component information in an illustrative embodiment.

FIG. 1 shows an information processing system 100 configured to implement functionality for authentication using keys derived from device component information in accordance with an illustrative embodiment. The information processing system 100 as shown comprises a plurality of network devices 102-1, 102-2 . . . 102-N, collectively referred to herein as network devices 102. The network devices 102 are coupled to a network 104, and in some embodiments may alternatively be viewed as comprising respective components of the network 104. The system 100 further comprises management servers 105 and a plurality of user devices 106-1, 106-2 . . . 106-M, with the user devices being collectively referred to herein as user devices 106. At least portions of the system 100 may be viewed as collectively comprising one or more computer networks.

The network devices 102 illustratively comprise respective sets of network interface cards (NICs) 110-1, 110-2 . . . 110-N, respective instances of processing logic 112-1, 112-2, . . . 112-N, and respective baseboard management controllers (BMCs) 114-1, 114-2 . . . 114-N, collectively referred to as respective NICs 110, processing logic 112 and BMCs 114.

It should be noted that this particular example configuration of system components, such as network devices 102, network 104, management servers 105 and user devices 106, can be varied relative to the arrangement shown in FIG. 1. For example, in other embodiments, different arrangements, possibly including additional or alternative system components, can be used to implement the disclosed functionality for authentication using keys derived from device component information.

A given one of the network devices 102 of system 100 may comprise, for example, a computer, a server, a host device, a storage system, or portions or combinations of these or other devices. Such network devices 102 are examples of what are more generally referred to herein as "processing devices." In some embodiments, one or more of the network devices 102 may be implemented at least in part using cloud-based virtualization infrastructure such as a virtual machine or container. Network devices 102 can include, for example, various arrangements of physical nodes and/or virtual nodes. The term "network device" as used herein is therefore intended to be broadly construed, so as to encompass these and other arrangements of one or more processing devices.

The network devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

A given one of the user devices 106 may comprise, for example, a mobile telephone, a laptop computer, a tablet computer, a desktop computer or another type of processing device from which one or more users can access system resources accessible via, or otherwise associated with, the network devices 102.

The user devices 106 are assumed to be associated with one or more users of the system 100. For example, such users can illustratively access protected resources of the system 100, such as protected resources of one or more of the network devices 102, by initiating a login procedure via one of the user devices 106. The term "user device" as used herein is intended to be broadly construed so as to encompass a wide variety of different types of processing devices or combinations of multiple such devices used to access network devices 102. A client system comprising multiple distinct processing devices is therefore considered a type of "client device" as that latter term is broadly used herein.

Also, it is to be appreciated that the term "user" in this context and elsewhere herein is intended to be broadly construed so as to encompass, for example, human, hardware, software or firmware entities, as well as various combinations of such entities.

Although multiple network devices 102, management servers 105 and user devices 106 are shown in the FIG. 1 embodiment, other embodiments can include single instances of such components rather than multiple instances of such components. The variables N and M denoting respective numbers of network devices 102 and user devices 106 are therefore considered arbitrary integer values greater than or equal to one.

The network 104 is assumed to comprise a portion of a global computer network such as the Internet, although other types of networks can be part of the information processing system 100, including a wide area network (WAN), a local area network (LAN), a satellite network, a telephone or cable network, a cellular network such as a 4G or 5G network, a wireless network such as a WiFi, WiMAX, Bluetooth or near field communication (NFC) network, or various portions or combinations of these and other types of networks. The information processing system 100 in some embodiments therefore comprises combinations of multiple different types of networks each comprising processing devices configured to communicate using IP or other related communication protocols. Numerous alternative networking arrangements are possible in a given embodiment, as will be appreciated by those skilled in the art.

The network 104 illustratively comprises a plurality of network switches. These may include, for example, various types of routers, switch fabrics or other types of switching equipment, including in some embodiments management switches for carrying management traffic between the management servers 105 and the network devices 102. Such network switches are also considered examples of "network devices" as that term is broadly used herein.

The network devices 102 in some embodiments comprise or are otherwise associated with one or more storage systems. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

The network devices 102 can comprise, for example, one or more host devices of a storage system of the type noted above, one or more storage nodes of a distributed storage system, and/or other types of physical or virtual nodes, although numerous other types and arrangements of network devices 102 are possible in a given embodiment. Again, network switches of the network 104 can also be considered "network devices" as that term is broadly used herein.

Although illustratively shown as being arranged internally to the network devices 102 in the illustrative embodiment of FIG. 1, the BMCs 114 in some embodiments can be arranged at least in part externally to their respective corresponding network devices 102. For example, a given one of the BMCs 114 can be implemented at least in part on a separate processing device coupled to its corresponding one of the network devices 102.

As indicated previously, in order to support management of diverse cloud infrastructure resources, such as compute nodes, storage nodes, network switches and/or other types of network devices, conventional approaches typically rely on a centralized management module. In order to support the desired management functionality, such a centralized management module typically needs to know the access credentials of the various network devices, and therefore stores such credentials in a repository of the centralized management module.

However, having all infrastructure resource credentials stored at a centralized location can lead to a number of drawbacks, including the following:

1. If an attacker gets access to a repository, then the security of the entire cloud infrastructure will be compromised.
2. Any change in credentials needs to be updated to the centralized management module.
3. There is no way for the infrastructure resources to interact with each other, other than via the centralized management module. For example, a compute server or other type of compute node cannot push its configuration information to a network switch as the former device does not have credentials for the latter device.
4. Addition or replacement of a node, network switch or other network device is a tedious process as it requires on-boarding of the new device in the centralized management module in order to make the new device compliant with the credentials, rules and other management functionality of the cloud infrastructure.

Illustrative embodiments disclosed herein address and overcome the above-described drawbacks of conventional approaches, by providing improved authentication techniques for autonomous and distributed credential-less management of network devices in cloud infrastructure. In some embodiments, such techniques provide a trusted secure channel for management data exchange among various infrastructure resources, such as network devices 102. In some embodiments, a dynamically selected one of the network devices 102 is utilized for attestation purposes relating to another network device, in order to introduce unpredictability for better security.

By way of example, in some embodiments, an inventory of components or other types and arrangements of device component information is exchanged between pairs of network devices 102 using one or more fingerprints and a shared vendor key. The shared vendor key may be, for example, a public vendor key that requires a corresponding private vendor key to decrypt items encrypted using the vendor public key. Symmetric vendor keys securely stored in network devices from the same vendor can additionally or alternatively be used.

A unique key can be generated by each network device in some embodiments using one or more fingerprints of one or more respective embedded device components. By using the shared component inventory or other device component information, any of the network devices 102 (e.g., a set of network devices within a defined boundary) can generate the appropriate unique key for communicating with any other one of the network devices 102. This unique key illustratively serves as the basis of a first authentication factor of a given authentication process carried out between a given pair of the network devices 102.

In addition, some embodiments implement a second authentication factor for enhanced security. One such embodiment forms an indexed list of all network devices available for selection as a broker for communication between two other network devices. The selection is illustratively implemented as a pseudorandom choice using a seed. The second factor challenge can illustratively only be serviced after setting up a successful connection with the broker which supplies the passcode in a secure manner. Additional or alternative authentication factors can be used in other embodiments.

In some embodiments, a device component inventory or other type or arrangement of device component information is utilized for generating a unique key that is used for communication between a given pair of network devices 102.

For example, the device component inventory for a server or other compute node can include one or more NICs, BMCs, storage devices and/or other components (e.g., infrastructure processing units (IPUs), data processing units (DPUs), BIOS components, NVMe components, etc.)

The device component inventory for a storage array or other storage node can include storage controllers, storage devices, etc.

The device component inventory for a network switch can include, for example, a network operating system (OS), controllers, etc.

A wide variety of different types of device component information can be used in other embodiments. Such information generally characterizes embedded components or other types of components of a given network device. The term "device component" as used herein is therefore intended to be broadly construed.

In some embodiments, a device component inventory or other type or arrangement of device component information is illustratively shared between a given pair of network devices 102 using LLDP packets, although other communication mechanisms can be used in other embodiments.

Such information is illustratively provided along with one or more fingerprints, such as individual fingerprints of respective device components and/or one or more composite fingerprints generated using fingerprints or other information characterizing multiple device components. Such fingerprints are illustratively utilized to generate a unique key that serves as the basis of a first authentication factor in illustrative embodiments.

In some embodiments, the network devices 102 implement respective management modules and/or respective proxy management agents, illustratively utilizing processing logic 112 and/or BMCs 114. For example, the BMCs 114 illustratively implement respective management modules in some embodiments. A given such management module illustratively comprises or is implemented at least in part within a "management controller" as that term is broadly used herein. The management servers 105 can implement one or more cloud management portals, illustratively having associated vendor plug-ins for respective vendors associated with the network devices 102, as will be described in more detail elsewhere herein. Also, it is to be appreciated that additional or alternative components can be used in other embodiments.

The management module of a given one of the network devices 102 is illustratively configured to generate an inventory or other type or arrangement of device component information characterizing a particular set of components implemented on the given network device. It additionally generates one or more fingerprints, illustratively by applying a hash function such as SHA-256 or SHA-512 to the device component information or portions thereof. Any of a wide variety of different secure hashing algorithms, checksum algorithms or other hash functions, in any combination, can be used in generating fingerprints as that term is broadly used herein. Multiple individual fingerprints may be generated for respective ones of the device components and/or one or more composite fingerprints may be generated for multiple device components, illustratively based at least in part on individual fingerprints generated for respective individual device components. Moreover, references herein to "generating at least one fingerprint" are intended to be broadly construed, so as to encompass, for example, arrangements in which a network device computes or otherwise obtains one or more fingerprints, possibly as a composite fingerprint based at least in part on one or more existing computed fingerprints and/or one or more previously-assigned fingerprints for respective components. Various combinations of retrieval from storage and/or computation may be used in generating fingerprints as that term is broadly used herein.

In some embodiments, the BMCs 114 can be configured as the above-noted management modules for the respective network devices 102. For example, a BMC can be configured as a management module for a compute server. Additionally or alternatively, such management modules can be implemented at least in part utilizing the instances of processing logic 112 on the respective network devices 102.

For other types of network devices, such as network switches, a network OS and associated module of the network switch can be collectively configured to serve as a management module for the network switch.

Each of the management modules of the respective network devices 102 illustratively includes or otherwise has access to a key vault or other secure repository where the above-noted keys, and possibly also the fingerprints and/or other related device component information, are kept. For example, the BMCs 114 implemented on the network devices 102 can manage all associated keys, fingerprints and/or related device component information in a key vault or other secure repository in an encrypted manner. A network switch may be similarly configured to maintain a key vault or other secure repository where it may store keys, fingerprints and/or related device component information. In some embodiments, the key vault of a network switch is configured to be relatively small compared to a key vault for a network device that includes a BMC, such as the network devices 102.

In the FIG. 1 embodiment, authentication techniques using keys derived from device component information are illustratively implemented at least in part using the NICs 110, processing logic 112 and BMCs 114 of the respective network devices 102.

For example, in some embodiments, a given one of the network devices 102, such as the first network device 102-1, is illustratively configured to identify a plurality of components of that network device, to generate at least one fingerprint based at least in part on the identified plurality of components of that network device, to encrypt the at least one fingerprint, to generate at least one packet containing at least the encrypted at least one fingerprint, and to send the at least one packet to at least one other one of the network devices 102, illustratively the second network device 102-2.

In some embodiments, the first network device 102-1 sends the at least one packet containing at least the encrypted at least one fingerprint to each of the other network devices 102. Moreover, each of the other network devices 102 in some embodiments is assumed to similarly perform the above-noted operations of identifying a plurality of components of that network device, generating at least one fingerprint based at least in part on the identified plurality of components of that network device, encrypting the at least one fingerprint, generating at least one packet containing at least the encrypted at least one fingerprint, and sending the at least one packet to at least one other one of the network devices 102, illustratively each of the other ones of the network devices 102.

It is to be appreciated that a wide variety of other techniques can be used to disseminate device component information, such as the above-noted fingerprints, among the network devices 102.

Also, the term "fingerprint" as used herein is intended to be broadly construed, so as to encompass, for example, a fingerprint generated from device component information for a single component, or a fingerprint generated from device component information for multiple components. Fingerprints as the term is broadly used herein can comprise, for example, single-component fingerprints and/or multiple-component fingerprints. Although some embodiments herein utilize to hash functions such as SHA-256 or SHA-512 to generate fingerprints from respective component identifiers or other information characterizing a plurality of components of a given network device, this is by way of illustrative example only, and additional or alternative techniques can be used to generate at least one fingerprint based at least in part on the identified plurality of components of the given network device.

After a first one of the network devices 102 sends the at least one packet to at least a second one of the network devices 102, the first and second network devices 102 interact with one another to obtain at least one key, such as the previously-described unique key, derived at least in part from the at least one fingerprint.

It should be noted that the term "derived from" as used herein is intended to be broadly construed, so as to encompass, for example, arrangements in which the at least one key is computed or otherwise determined based at least in part on the at least one fingerprint. Accordingly, at least one key derived at least in part from the at least one fingerprint need not itself contain any portion of the at least one fingerprint. For example, as described elsewhere herein, the at least one key can be computed at least in part as a function of at least the at least one fingerprint and at least one authentication token.

The at least one key is utilized in an authentication process carried out between the first network device and the second network device. The authentication process can comprise a single-factor authentication process or a multi-factor authentication process, examples of which are described in more detail elsewhere herein.

As indicated previously, each of the network devices 102 is an example of what is more generally referred to herein as a "processing device." Other arrangements of at least one processing device can be configured to implement corresponding portions of the authentication functionality disclosed herein.

The BMCs 114 are an example of what is more generally referred to herein as "management controllers" of the network devices. Other types and arrangements of management controllers can be used in other embodiments. Such management controllers are illustratively configured to carry out at least portions of the authentication functionality using keys derived from device component information as disclosed herein.

The BMCs 114 of the respective network devices 102 are illustratively configured to communicate with one another. For example, the BMC 114-1 of the first network device 102-1 is illustratively configured to communicate with the BMC 114-2 of the second network device 102-2, and similar inter-BMC communication arrangements are assumed for each of the other BMCs 114 of the other network devices 102. Accordingly, each of one or more of the BMCs 114 is illustratively configured to communicate with one or more other ones of the BMCs 114, to facilitate authentication using keys derived from device component information as disclosed herein.

In addition, as indicated previously, each of the BMCs 114 is assumed to communicate with at least one of the management servers 105, illustratively via one or more management switches of the network 104.

In some embodiments, encrypting the at least one fingerprint comprises encrypting the at least one fingerprint utilizing a vendor key that is common to the first and second network devices. Also, additional information can be encrypted with the at least one fingerprint. For example, in some embodiments, encrypting the at least one fingerprint comprises encrypting the at least one fingerprint and encrypting additional information characterizing the identified plurality of components. In such an embodiment, the encrypted at least one fingerprint and the encrypted additional information characterizing the identified plurality of components are illustratively incorporated into at least one payload of the at least one packet that is sent to at least the second network device.

Such packets used to convey device component information and associated fingerprints in encrypted form between the network devices 102 are also referred to herein as "device component information" packets, and can be implemented using a wide variety of different packet formats and protocols.

For example, in some embodiments, a given such device component information packet illustratively comprises a Link Layer Discovery Protocol (LLDP) packet, although other types and arrangements of additional or alternative packets can be used to convey device component information between the network devices 102.

Conventional aspects of LLDP packets are described in, for example, IEEE Standard 802.1AB-2016, "Station and Media Access Control Connectivity Discovery," January 2016, which is incorporated by reference herein in its entirety.

In illustrative embodiments disclosed herein, an LLDP packet payload is modified to incorporate device component information sent by one of the BMCs 114 to another one of the BMCs 114.

A more detailed example of an LLDP packet configured in accordance with aspects of the present disclosure to convey device component information between the BMCs 114 of the network devices 102 will be described below in conjunction with FIG. 3. The term "device component information" as used herein is intended to be broadly construed, and may comprise any of the particular types of information mentioned in conjunction with the FIG. 3 example, as well as additional or alternative information.

In some embodiments, the BMC 114-1 of the network device 102-1 is configured to exchange one or more LLDP packets or other types of device component information packets with one or more other ones of the BMCs 114 of one or more other ones of the network devices 102, such as with the BMC 114-2 of the network device 102-2. Each of the other BMCs 114 of respective ones of the other network devices 102 is similarly configured to support exchange of device component information packets.

As indicated previously, the network devices 102 in some embodiments implement respective proxy management agents, illustratively in association with the above-noted management modules of the respective network devices 102.

For example, a first network device illustratively comprises a first proxy management agent that is configured to communicate with a second proxy management agent of a second network device and with a cloud management portal. Such a cloud management portal is illustratively provided in system 100 by or in association with one or more of the management servers 105. These and other references herein to a first network device and a second network device can refer to any two of the network devices 102 and/or other network devices such as one or more network switches of the network 104.

In some embodiments, the first network device is configured to exchange workload data with the second network device via their respective proxy management agents. Based at least in part on such workload data exchanged between network devices, one of the first and second proxy management agents of the respective first and second network devices is at least temporarily designated as a primary proxy management agent and the other one of the first and second proxy management agents of the respective first and second network devices is at least temporarily designated as a secondary proxy management agent. Such primary/secondary designations change dynamically over time, based at least in part on relative workloads of the respective first and second network devices. For a given set of network devices, such as the network devices 102, only one of the network devices has its proxy management agent designated as the primary proxy management agent at any given point in time, while the other network devices have their respective proxy management agents designated as secondary proxy management agents. Accordingly, the role of primary proxy management agent illustratively rotates between the proxy management agents of the network devices 102 in a dynamic manner over time based at least in part on their respective workloads.

In some embodiments, the at least one key referred to above, illustratively the "unique key," is generated as a function of the at least one fingerprint and an authentication token. Such an authentication token is illustratively provided from one of the network devices 102 to another one of the network devices 102, and is utilized by the receiving network device in generating the at least one key based at least in part on device component information and one or more associated fingerprints of the sending network device.

An example process for generation of a unique key will now be described. It is assumed in this example that a first network device, denoted Node A, is initiating an authentication session with a second network device, denoted as Node B. It is further assumed that Node A has already obtained the device component information and an associated fingerprint of Node B, illustratively via LLDP packet exchange as previously described. In this example, the following computations are performed at Node A:

$XOR(FP_{NodeB}, AT) = UK$ $E_{VK}(UK)$ where:

| | |
|---|---|
| XOR | Bitwise exclusive-OR |
| $FP_{NodeB}$ | Binary string of fingerprint of Node B |
| AT | Binary string of authentication token sent by Node B to Node A |
| UK | Binary string of generated unique key |
| VK | Vendor key available to both Node A and Node B |
| E | Encryption process using standard techniques such as AES |

The unique key UK computed as shown above is sent in its encrypted form $E_{VK}(UK)$ from Node A to Node B. Node B decrypts $E_{VK}(UK)$ using vendor key VK to obtain UK. Node B then utilizes the obtained UK to compute AT as follows:

$XOR(FP_{NodeB}, UK) = AT$

The resultant AT should match the authentication token previously sent by Node B to Node A for successful operation.

In some embodiments, the authentication process comprises a multi-factor authentication process and a first factor of the multi-factor authentication process comprises verifying that each of the first and second network devices has access to the same at least one key.

For example, verifying that each of the first and second network devices has access to the same at least one key illustratively comprises receiving, in one of the first and second network devices, an authentication token from the other one of the first and second network devices, generating the at least one key based at least in part on the at least one fingerprint and the received authentication token, encrypting the at least one key, and sending the encrypted at least one key to the network device that sent the authentication token. That sending network device decrypts the received encrypted at least one key, and utilizes a result thereof to determine if the first factor is satisfied.

With reference again to the previous example involving Node A and Node B, verification of the first factor of the multi-factor authentication process illustratively involves Node A receiving the authentication token AT from Node B, computing the unique key UK from the Node B fingerprint $FP_{NodeB}$ and AT, encrypting the resulting UK and sending the encrypted UK to Node B. Node B then decrypts UK and uses the Node B fingerprint $FP_{NodeB}$ to recompute AT. If the AT value recomputed by Node B matches the AT value originally sent by Node B to Node A, the first factor is satisfied.

It is to be appreciated that the above-described first factor can alternatively be used as the only authentication factor in a single-factor authentication process.

In some embodiments, a second factor of a multi-factor authentication process illustratively comprises randomly selecting one of a plurality of other network devices, sending a passcode from one of the first and second network devices to the selected one of the other network devices, and verifying that the other one of the first and second network devices can obtain the passcode from the selected one of the other network devices. In such an embodiment, randomly selecting one of the plurality of other network devices illustratively comprises selecting a given such network device based at least in part on a seed value generated by one of the first and second network devices and communicated from that one of the first and second network devices to the other one of the first and second network devices.

Other types and arrangements of additional or alternative operations may be used in an authentication process in other embodiments. A more particular example of such an authentication process will be described below in conjunction with FIG. 5.

The particular example functionality attributed to first and second network devices in the above description of illustrative embodiments can be similarly implemented in other pairs of the network devices 102, utilizing their respective instances of NICs 110, processing logic 112 and BMCs 114, as well as in other network devices of the system 100, such as network switches of the network 104.

It is to be appreciated that the particular set of system elements and other components and associated functionality as illustrated in the system 100 of the FIG. 1 embodiment is presented by way of example only, and a wide variety of alternative arrangements can be used in other embodiments. For example, at least portions of the functionality associated with components 110, 112 and 114 in other embodiments can be combined into a single component, or separated across a larger number of components.

It should also be noted that at least portions of the processing logic 112 of network devices 102 are illustratively implemented at least in part in the form of software comprising program code stored in memory and executed by a processor.

An illustrative embodiment of an example process for authentication using keys derived from device component information in the information processing system 100 will now be described in more detail with reference to the flow diagrams of FIG. 2.

Figure 2A:
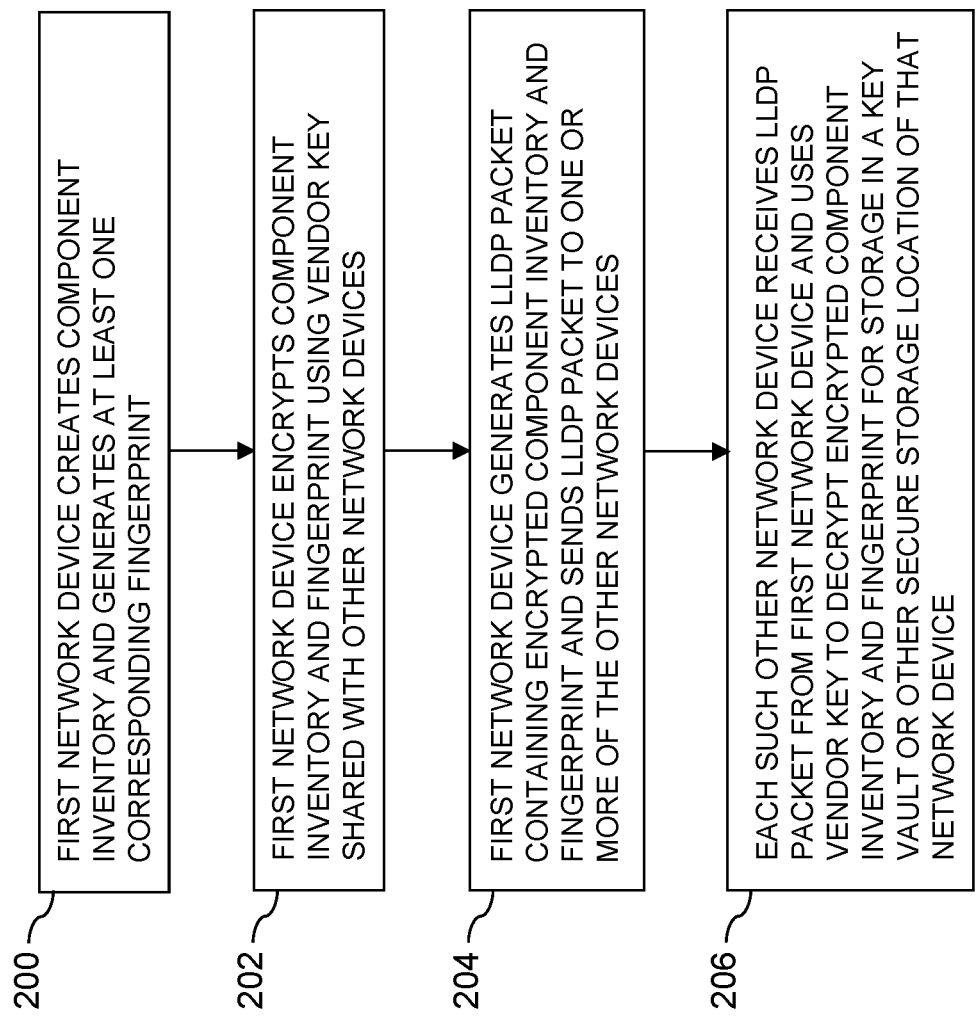
FIGS. 2A and 2B are flow diagrams showing different portions of an example process for authentication using keys derived from device component information in an illustrative embodiment. These figures are collectively referred to herein as FIG. 2.
Figure 2B:
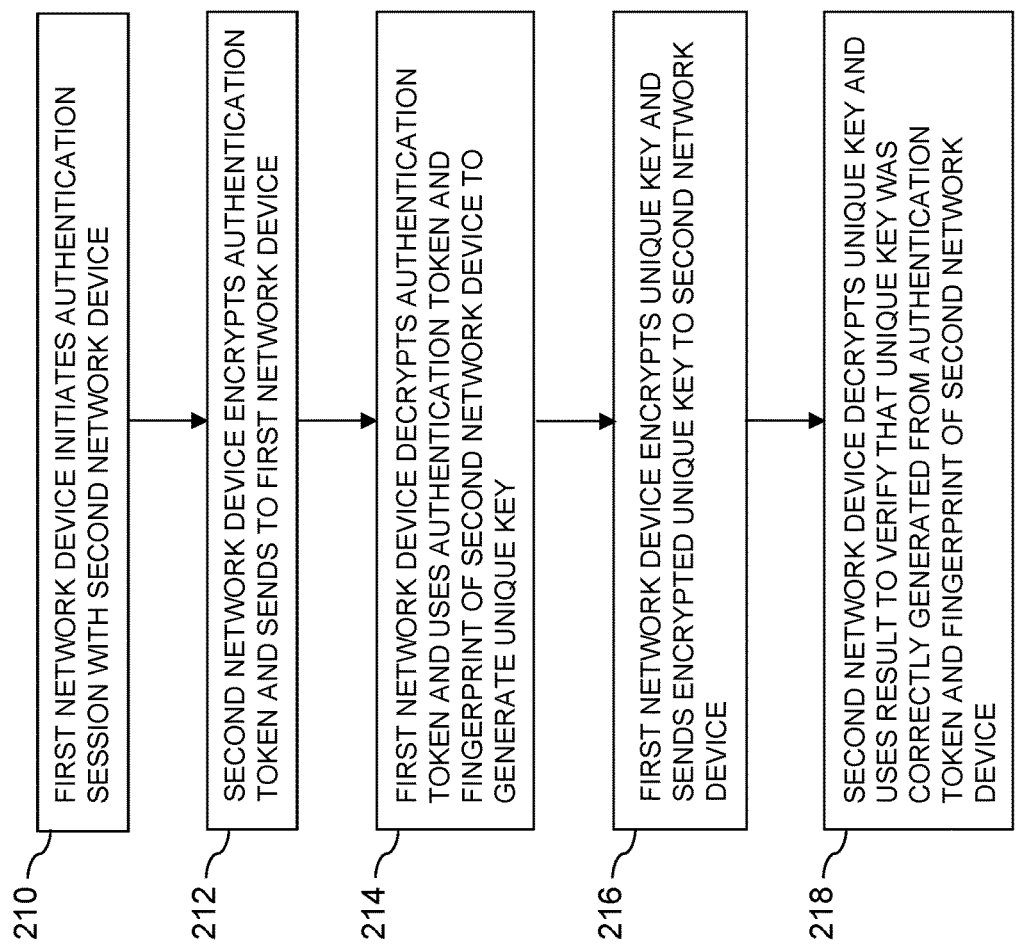

As indicated previously, FIG. 2 more particularly comprises separate portions denoted herein as FIG. 2A and FIG. 2B. FIGS. 2A and 2B show different portions of an example process for authentication using keys derived from device component information in an illustrative embodiment.

This example process is illustratively carried out between two or more network devices, such as first and second network devices of the network devices 102 of system 100, illustratively utilizing their corresponding instances of NICs 110, processing logic 112 and BMC 114, although additional or alternative system components may be used in other embodiments. It is also to be understood that this particular process is only an example, and additional or alternative processes can be carried out in other embodiments.

Referring initially to FIG. 2A, this portion of the example process illustrates the exchange of device component information and at least one associated fingerprint between particular ones of the network devices 102.

In step 200, a first network device creates a component inventory for multiple components of the first network device and generates at least one corresponding fingerprint for at least a portion of the component inventory. Other types and arrangements of device component information and one or more associated fingerprints can be used. A given such fingerprint illustratively characterizes identifying information of one or more components of the first network device, such as one or more component identifiers.

In step 202, the first network device encrypts the component inventory and the fingerprint using a vendor key shared with other network devices.

In step 204, the first network device generates an LLDP packet containing the encrypted component inventory and the fingerprint and sends the LLDP packet to one or more of the other network devices.

In step 206, each such other network device receives an LLDP packet from the first network device and uses the vendor key to decrypt the encrypted component inventory and fingerprint for storage in a key vault or other secure storage location of that network device.

Referring now to FIG. 2B, this portion of the example process illustrates an implementation of a first authentication factor in an authentication session carried out between particular ones of the network devices 102.

In step 210, a first network device initiates an authentication session with a second network device. The first and second network devices in the FIG. 2B portion of the example process need not be the same network devices referred to in the FIG. 2A portion of the example process. Different instances of each portion of the example process are illustratively carried out between respective multiple distinct pairs of network devices.

In step 212, the second network device encrypts an authentication token and sends the encrypted authentication token to the first network device.

In step 214, the first network device decrypts the encrypted authentication token and uses the authentication token and a fingerprint of the second network device to generate a unique key. It is assumed that the fingerprint of the second network device was previously obtained by the first network device utilizing operations similar to those of FIG. 2A.

In step 216, the first network device encrypts the unique key and sends the encrypted unique key to the second network device.

In step 218, the second network device decrypts the unique key and uses the result to verify that the unique key was correctly generated from the authentication token and fingerprint of the second network device. More particularly, the second network device illustratively recomputes the authentication token from the unique key and the fingerprint, and verifies that the recomputed authentication token matches the authentication token that it had previously sent to the first network device in step 212.

The particular processing operations and other system functionality described in conjunction with the flow diagrams of FIG. 2 are presented by way of illustrative example only, and should not be construed as limiting the scope of the present disclosure in any way. Alternative embodiments can use other types of processing operations to implement authentication using keys derived from device component information as disclosed herein. For example, certain steps may be performed at least in part concurrently with one another rather than serially. As additional examples, at least portions of the process steps may be repeated periodically for different authentication instances, between the same or different network devices, and multiple such instances can be performed in parallel with one another to implement authentication for multiple distinct sets of network devices.

Also, functionality such as that described in conjunction with the flow diagrams of FIG. 2 can be implemented at least in part in the form of one or more software programs stored in program code of at least one memory and executed by at least one processor in one or more processing devices implementing a process for authentication using keys derived from device component information as disclosed herein. A storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative arrangements for authentication using keys derived from device component information can be used in other embodiments.

Additional illustrative embodiments of authentication arrangements using keys derived from device component information will now be described with reference to FIGS. 3 through 6. A given network device in these and other embodiments herein illustratively comprises one or more nodes, such as one or more physical nodes, one or more virtual nodes, and/or a combination of at least one physical node and at least one virtual node. The term "network device" as used herein can therefore encompass one or more nodes of various types. Additionally or alternatively, a network device can comprise a network switch.

Figure 3:
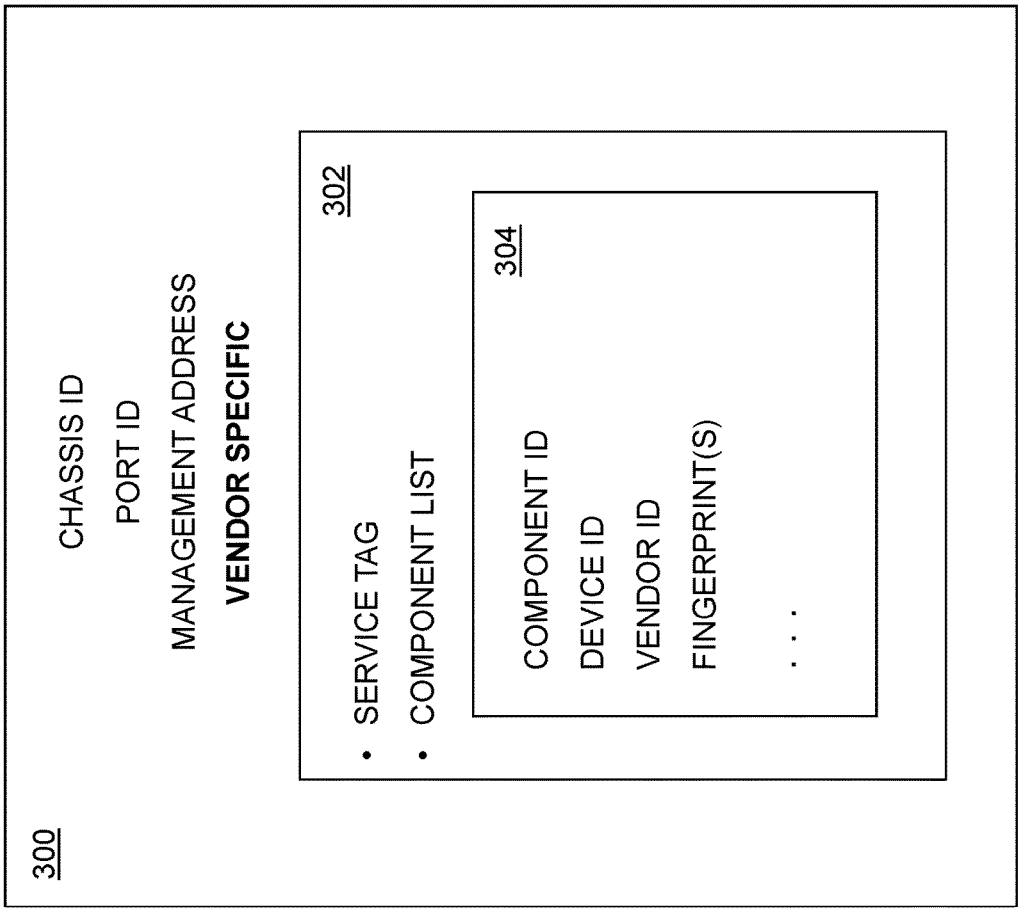
FIG. 3 shows an example LLDP packet payload for utilization in an example process for authentication using keys derived from device component information in an illustrative embodiment.

Referring now to FIG. 3, an example payload 300 for an LLDP packet conveyed from one BMC of one network device to another BMC of another network device is shown. For example, the example payload 300 is illustratively included in one or more LLDP packets sent from BMC 114-1 to BMC 114-2 in system 100, or vice versa. The example payload 300 may be sent in a single LLDP packet or distributed across multiple LLDP packets. Similar packets having similar payload formats are assumed to be conveyed between multiple distinct pairs of the network devices 102, and possibly to and/or from other network devices of system 100, such as network switches of the network 104.

In this embodiment, the example payload 300 of the LLDP packet illustratively comprises a chassis identifier (ID), a port ID, a management address, and vendor specific information 302. The vendor specific information 302 in this example illustratively includes at least a service tag and a component list relating to one or more components of the corresponding network device. The component list, also referred to herein as a component inventory, illustratively comprises, for each of one or more device components, information 304 such as a component ID, a device ID, a vendor ID and one or more fingerprints, each of which may be generated based at least in part on one or more of the component ID, a device ID, a vendor ID, and possibly other types of device component information as that term is broadly used herein.

Additional or alternative information can be included in the LLDP packet payload in other embodiments. Also, illustrative embodiments are not limited to use with LLDP packets, but can utilize other types of packets in other communication protocols.

Figure 4:
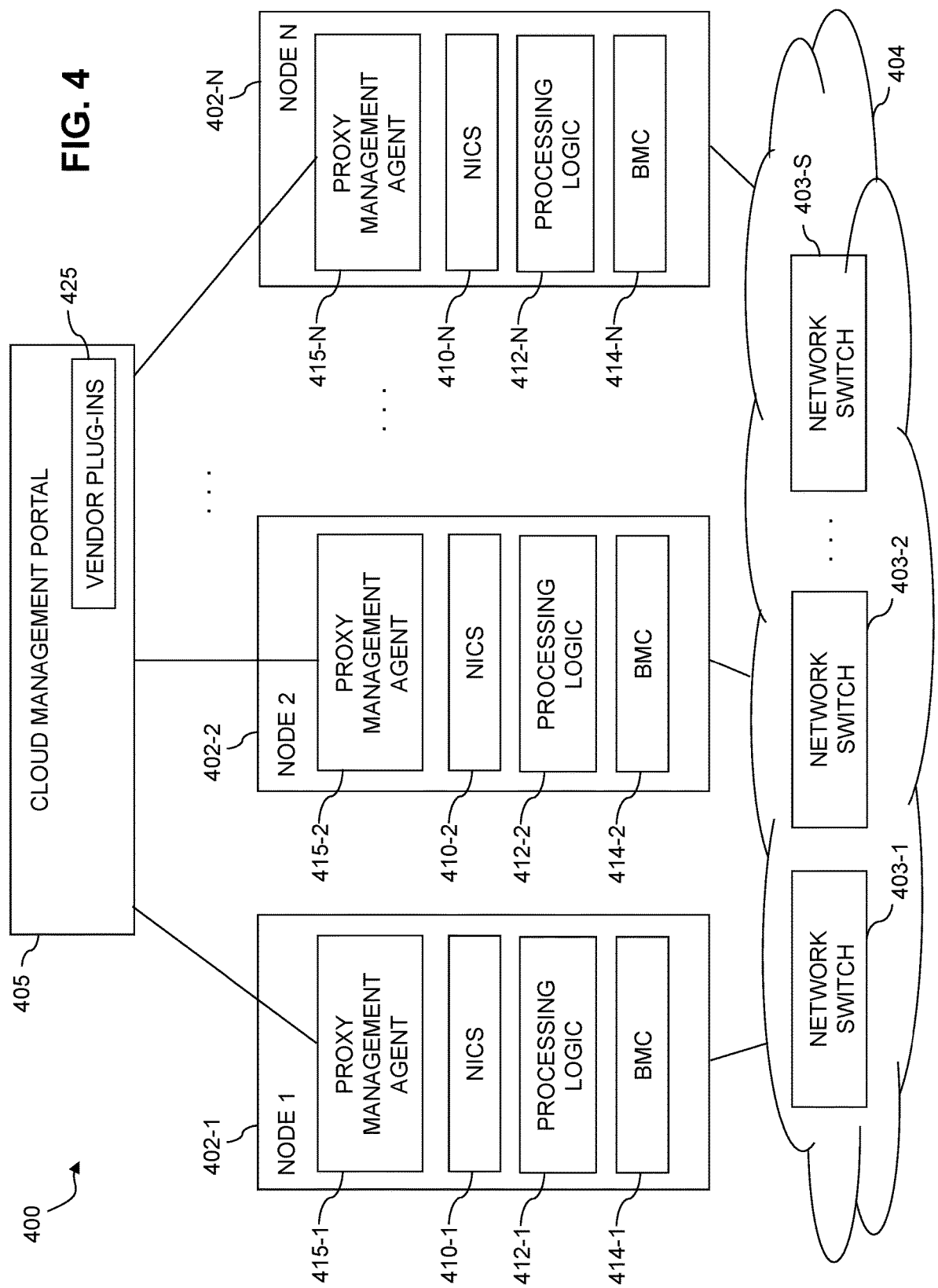
FIG. 4 is a block diagram of another example information processing system implementing authentication using keys derived from device component information in an illustrative embodiment.

FIG. 4 shows an information processing system 400 comprising a set of network devices in the form of nodes 402-1, 402-2, . . . 402-N, collectively referred to as nodes 402, in another illustrative embodiment.

The system 400 as shown includes a network 404 comprising a plurality of network switches 403-1, 403-2, . . . 403-S, collectively referred to as network switches 403. Like the nodes 402, such network switches 403 are also considered "network devices" as that term is broadly used herein. A wide variety of additional or alternative arrangements of nodes, network switches and/or other network devices can be used in system 400.

The system 400 implements aspects of the disclosed authentication techniques utilizing NICs 410-1, 410-2, . . . 410-N, processing logic 412-1, 412-2 . . . 412-N, and BMCs 414-1, 414-2 . . . 414-N, collectively referred to as NICs 410, processing logic 412 and BMCs 414, respectively, as implemented at least in part within their respective corresponding ones of the nodes 402. Such authentication techniques illustratively also utilize a plurality of proxy management agents 415-1, 415-2, . . . 415-N, collective referred to as proxy management agents 415, implemented on respective ones of the nodes 402. The proxy management agents 415 illustratively serve as respective endpoints for management-related interactions, and possibly other types of interactions, between their respective nodes 402.

As indicated previously, different ones of the proxy management agents 415 can be in different operating states at different times, for example, with a particular one of the proxy management agents 415 being designated as either primary or secondary at a given point in time. In some embodiments, only one of the proxy management agents 415 is designated as a primary proxy management agent at any given point in time, with the others each being designated as secondary proxy management agents. The primary proxy management agent is illustratively in an "active" state on its corresponding network device, while the secondary proxy management agents are each in a "dormant" state on their corresponding network devices. These designations may vary dynamically over time, based at least in part on workloads of the corresponding network devices, such as workloads of respective management modules or other management controllers of the network devices. Such workload information is illustratively exchanged between the nodes 402, illustratively via the proxy management agents 415, utilizing at least portions of their associated NICs 410, processing logic 412 and BMCs 414.

The proxy management agents 415 in this embodiment also interact with a cloud management portal 405, illustratively comprising one or more vendor plug-ins 425. Each such vendor plug-in contains a corresponding vendor certificate that may have an associated vendor public key.

The cloud management portal 405 illustratively implements a centralized management application for management of infrastructure such as nodes 402 and network switches 403 in the system 400.

A given one of the vendor plug-ins 425 illustratively comprises a vendor management module or service provided by a vendor and made available on the cloud management portal 405 for any interaction with infrastructure. As indicated above, it can include a vendor certificate supporting one or more vendor keys. For example, the vendor certificate can be associated with a vendor public key, and the nodes 402 can have respective private vendor keys. Additionally or alternatively, shared vendor keys may be utilized by the nodes 402, such as one or more symmetric keys. These and other arrangements are intended to be encompassed by the term "vendor key" as that term is broadly used herein.

An example workflow in illustrative embodiments is as follows, although it is to be appreciated that additional or alternative processes and operations can be used in other embodiments. Portions of this example workflow are illustrated in corresponding ones of FIGS. 5A, 5B and 5C.

Identity Information Exchange Process

1. LLDP packets are exchanged between nodes as disclosed herein to support exchange of node identity including component information and associated fingerprints.

2. A given such LLDP packet illustratively carries a component list, component inventory or other component information of the corresponding network device, along with one or more fingerprints of components. These fingerprints, and possibly also the associated component information, are illustratively encrypted using a vendor key.

3. A node receiving the LLDP packet decrypts the received fingerprints and possibly also the associated component information, and stores one or more such items in a key vault available on the node.

4. With this process, each node in the infrastructure can obtain details and identities of all the other nodes and their corresponding component lists and associated fingerprints, for use in authentication sessions as described below.

Authentication Session Initiation

Figure 5A:
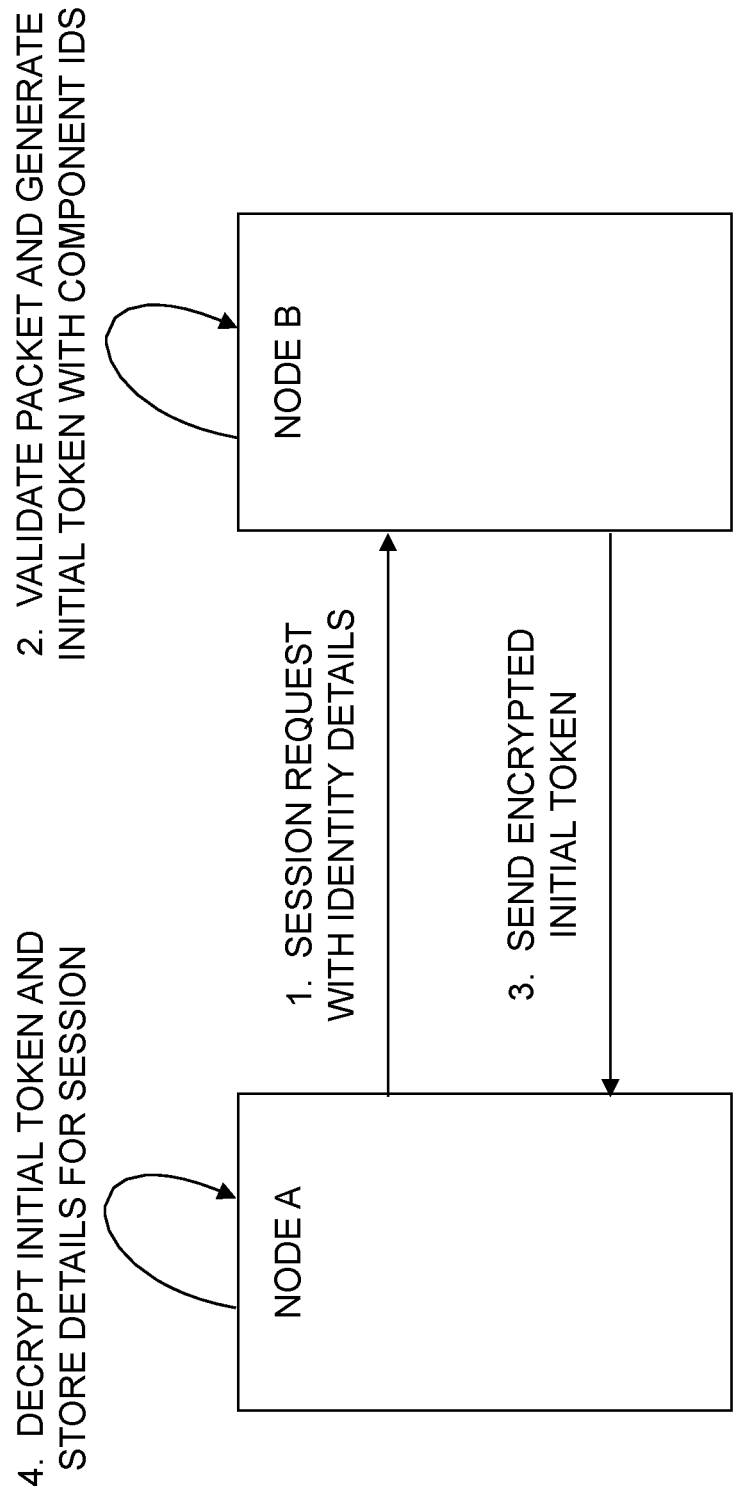
FIGS. 5A, 5B and 5C are flow diagrams showing different portions of an example multi-factor authentication process using keys derived from device component information in an illustrative embodiment. These figures are collectively referred to herein as FIG. 5.

FIG. 5A illustrates an example authentication session initiation for an authentication process using keys derived from device component information as disclosed herein. The example authentication session initiation illustratively includes the following operations involving two network devices, denoted as Node A and Node B.

1. A source node, assumed by way of example to be Node A, requests the establishment of an authentication session by sending a request packet with identity details of Node A. The identity details of the request packet are illustratively encrypted using a vendor key.

2. The receiving node, assumed by way of example to be Node B, validates the request packet and its identity details, and generates an initial token which contains one or more component IDs of respective components of Node B. These components may be picked randomly by Node B, illustratively from a component list, which may be "seeded" to facilitate random selection, or may be selected using other techniques.

3. Node B encrypts the initial token using a vendor key and sends the encrypted token back to the source node, Node A.

4. Node A decrypts the received encrypted token using a vendor key, and stores the details for the session.

First Factor Authentication

Figure 5B:
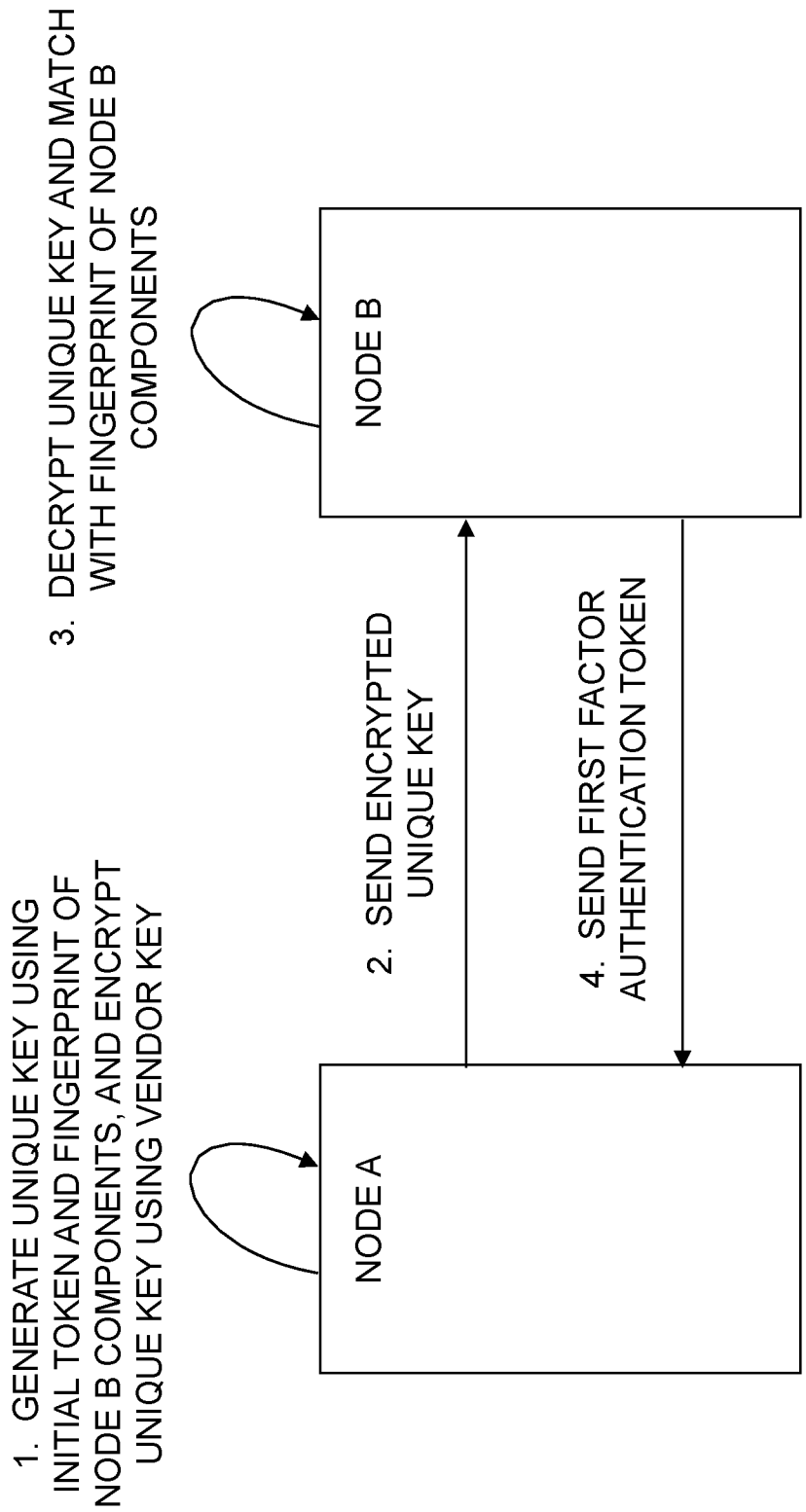

FIG. 5B illustrates an example first factor authentication in an authentication process using keys derived from device component information as disclosed herein. The example first factor authentication illustratively includes the following operations, also involving the two network devices denoted as Node A and Node B.

1. Node A uses the initial token received from Node B and one or more component fingerprints of Node B available in its key vault to generate a unique key. The unique key is encrypted using a vendor key.

2. The resulting encrypted key is sent by Node A to Node B, illustratively as part of an authentication request.

3. Node B decrypts the unique key using a vendor key and matches it against the one or more fingerprints of the Node B components utilized by Node A to generate the unique key, illustratively using techniques for recomputing the initial token from the received unique key, as described elsewhere herein.

4. Assuming a correct match is obtained, indicating that the first factor authentication is successful, Node B generates a first factor authentication token and sends it to Node A. The first factor authentication token is illustratively obtained in conjunction with first factor authentication using direct communication between Node A and Node B without another node serving as an intermediary. This first factor authentication token and other authentication tokens referred to herein can each be generated, for example, as an alphanumeric string of a specified fixed length. In some embodiments, the first factor authentication token can be utilized by Node A in performing one or more of its portions of the example second factor authentication to be described below. For example, it can be used in determining another node that serves as an intermediary between Node A and Node B as part of the second factor authentication. Other cryptographic techniques known to those skilled in the art can be used to generate and utilize authentication tokens in illustrative embodiments herein. Terms such as "authentication token" as used herein are therefore intended to be broadly construed.

Second Factor Authentication

Figure 5C:
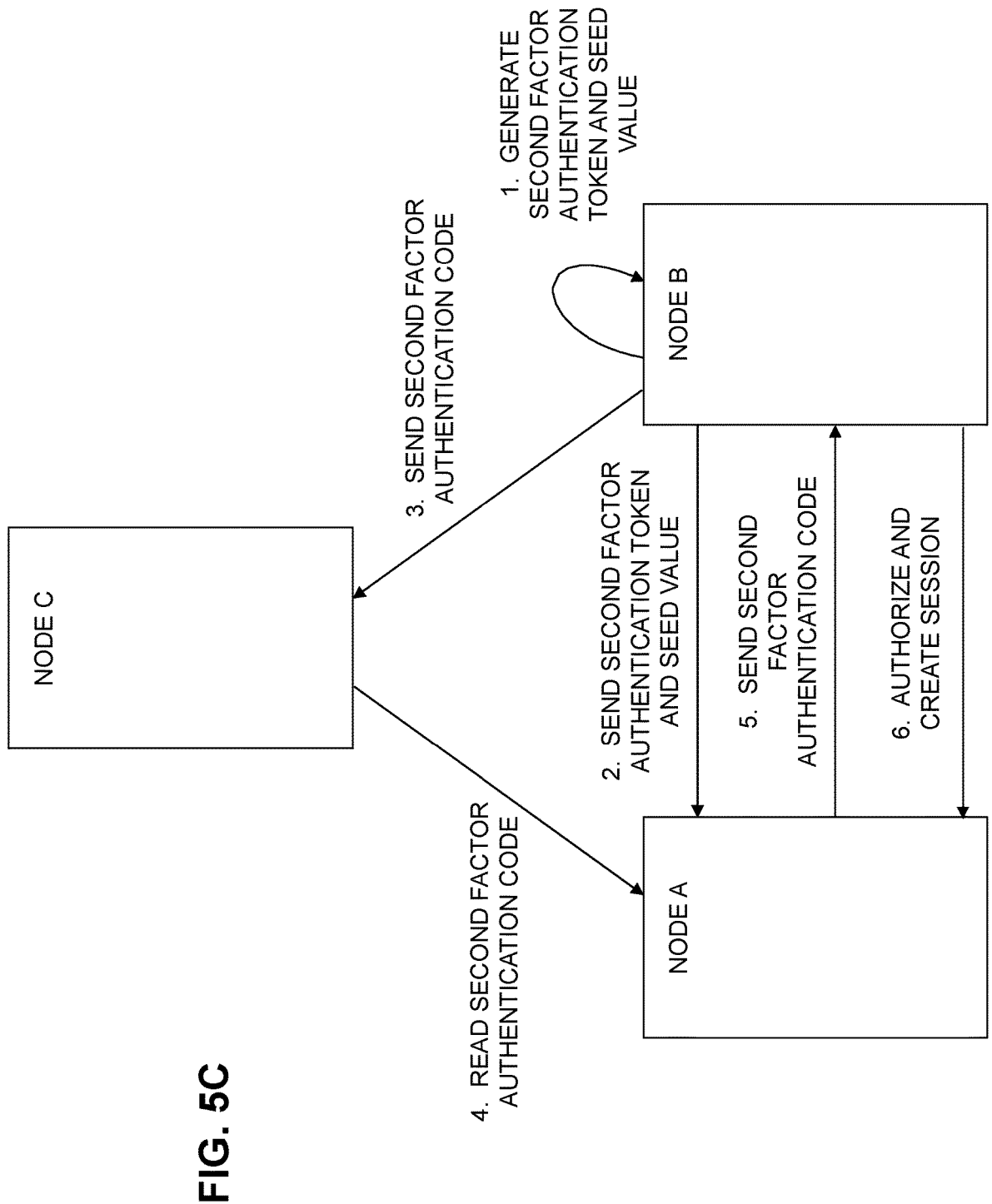

FIG. 5C illustrates an example second factor authentication in an authentication process using keys derived from device component information as disclosed herein. The example second factor authentication illustratively includes the following operations, also involving the two network devices denoted as Node A and Node B, but further involving a third network device denoted as Node C, which is randomly selected to serve as an intermediary between Node A and Node B for the second factor authentication.

1. Node B generates a second factor authentication token and a seed value, illustratively a pseudorandom number. Like the first factor authentication token mentioned above, the second factor authentication token can be generated, for example, as an alphanumeric string of a specified fixed length, or using other techniques.

2. Node B sends the second factor authentication token and the seed value to Node A, illustratively in a packet encrypted using a vendor key. The second factor authentication token and the seed value are utilized by Node A to identify and communicate with Node C, the randomly-selected intermediary.

3. Node B sends a second factor authentication code to another node that is randomly selected based on the seed value, in this case Node C.

4. Node A utilizes the decrypted second authentication factor and seed value obtained from Node B to identify Node C and to read the second factor authentication code from Node C.

5. Node A sends the second factor authentication code to Node B, again in encrypted form.

6. After verification of the second factor authentication code by Node B, the authentication is deemed successful. Node B authorizes and creates the session. This illustratively includes sending a final authentication code back to Node A that will be used for the session. In some embodiments, this final authentication code comprises a session key that is used for identification of a valid authenticated session created between Node A and Node B. This session key typically has a corresponding time-to-live value and is used by Node A for any further communication with Node B, and vice versa, for as long as the session key remains valid based on its corresponding time-to-live value.

Again, the particular operations of the above-described example workflow, as illustrated in FIGS. 5A, 5B and 5C, are non-limiting and can be varied in other embodiments.

Figure 6:
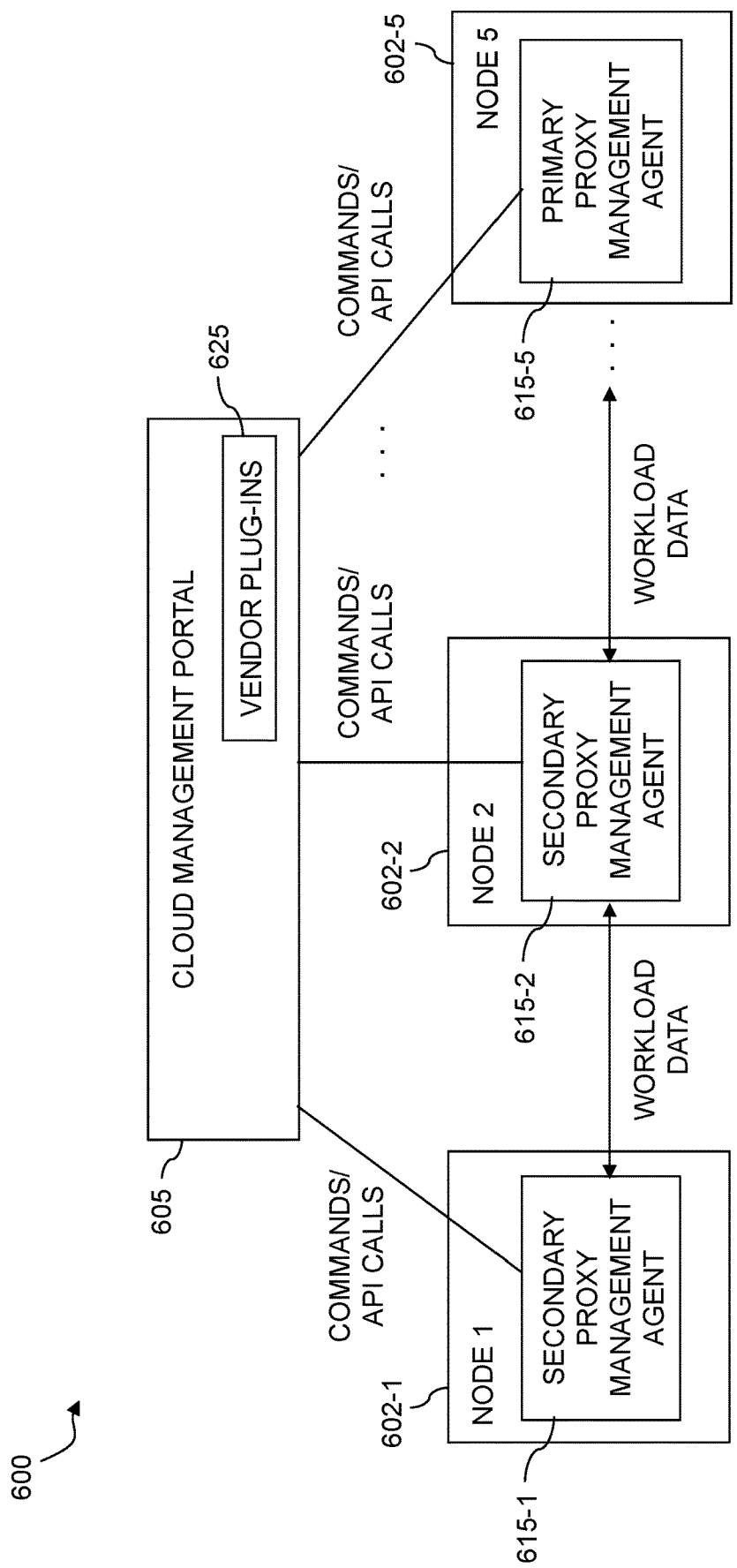
FIG. 6 is a block diagram of yet another example information processing system implementing authentication using keys derived from device component information in an illustrative embodiment.

Referring now to FIG. 6, an information processing system 600 comprises a set of network devices in the form of nodes 602-1, 602-2 . . . 602-5, collectively referred to as nodes 602, in another illustrative embodiment. The nodes 602 comprise respective proxy management agents 615-1, 615-2, . . . 615-5, collectively proxy management agents 615, which interact via commands and API calls with a cloud management portal 605 that includes one or more vendor plug-ins 625. One of the proxy management agents 615, illustratively proxy management agent 615-5 on node 602-5, is currently designated as the primary proxy management agent, and the other proxy management agents 615 are each currently designated as secondary proxy management agents, although such designations should be understood to vary dynamically over time. The proxy management agents 615 exchange workload data with one another as illustrated in the figure, and such workload data can be used to change the primary/secondary designations of the proxy management agents 615 as needed.

Cloud Service Plug-in and Workflow for Proxy Management Agent

An example workflow implemented in the system 600 of FIG. 6 illustratively includes the following operations. In this example, a given one of the vendor plug-ins 625 is more particularly referred to as a "cloud service plug-in."

1. Proxy management agents are implemented on or otherwise in association with respective management modules of their respective nodes, and illustratively carry an embedded vendor-based certificate and private key.

2. A given one of the proxy management agents is dynamically selected to serve as the primary proxy management agent, illustratively based on tasks and other workload items executing on their corresponding management modules of their respective nodes. The management modules of the respective nodes share their workload data as illustrated in the figure. For this sharing they use the above-described authentication mechanism, with first factor and second factor authentication. This authentication occurs periodically, illustratively at fixed intervals (e.g., once every hour). Based on workload data, the primary proxy management agent is selected, and that selection is shared among the nodes.

3. Each proxy management agent has the identities of all of the management modules and their associated nodes. This illustratively includes information such as MAC address and IP address of all the NICs, service tags, node identifiers, etc.

4. The primary proxy management agent performs a handshake with a node and its management module using one or more packets encrypted using a vendor key.

5. After the handshake, commands and other information associated with one or more packets are exchanged between the proxy management agent and the management module of the node.

6. The cloud service plug-in also carries a vendor key that is used for any communication with the management module.

7. The cloud service plug-in is able to talk to the proxy management agent after certificate exchange and endpoint verification.

8. The cloud service plug-in sends commands and/or API calls that are redirected to the proxy management agent and then the proxy management agent executes such commands and/or API calls on the node and returns the data back to the cloud service plug-in.

This particular example workflow and its associated operations as described above and illustrated in FIG. 6 should not be construed as limiting in any way, and can be varied in other embodiments.

Again, the above-described processes and other features and functionality disclosed herein are presented by way of illustrative example only, and other embodiments can utilize additional or alternative arrangements.

As indicated previously, illustrative embodiments provide a number of significant advantages relative to conventional arrangements.

For example, some embodiments provide techniques for authentication using keys derived from device component information.

In some embodiments, the disclosed techniques advantageously avoid the security issues and other drawbacks associated with centralized storage of passwords or other credentials for network devices of cloud infrastructure.

Illustrative embodiments provide systems, methods, apparatus and computer program products that provide de-centralized and zero-touch vulnerability management by eliminating risky password and/or other credential management practices and reducing attack vectors.

Additionally or alternatively, the disclosed embodiments include techniques for using device component fingerprints for authentication, techniques for using dynamic hardware proxy management agents for communication and API calls, and/or techniques for using device component information to generate random unique keys.

As indicated previously, passwords and other credentials have become a significant vulnerability in secure infrastructure, particularly cloud infrastructure. Credentials generally require secure handling and storage to remain a solid barrier to infrastructure access. Illustrative embodiments disclosed herein, by uniquely eliminating the need for credentials for network device access while keeping the communication secure, provide significant advantages relative to conventional practice.

For example, some embodiments provide an autonomous ability for varied ranges of IT infrastructure equipment to securely communicate with each other without any explicit user interventions.

Additionally or alternatively, some embodiments provide self-governed automatic discovery of basic information on IT assets with minimal guidance from user, seamless user experiences by eliminating the recurring responsibilities of password and/or secrets rotations, and/or credential-less management of cloud infrastructure by management applications/services deployed on-premises or cloud.

Some embodiments can be used for an edge category of devices where a BMC implemented on an edge device and a corresponding smart NIC are utilized to orchestrate aspects of the disclosed functionality.

Additionally or alternatively, illustrative embodiments can be used to facilitate secure management in HCI cluster or in other types and arrangements of cloud infrastructure, including a "dark site" scenario.

The disclosed techniques can be advantageously deployed in a wide variety of different computer networks or other information processing system arrangements, such as cloud infrastructure, cluster infrastructure or other deployments of IT infrastructure.

Some embodiments disclosed herein provide systems and methods that are agnostic to the particular network topology in the IT infrastructure.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement processing devices with authentication functionality using keys derived from device component information will now be described in greater detail with reference to FIGS. 7 and 8. Although described in the context of system 100, these platforms may also be used to implement at least portions of other information processing systems in other embodiments, such as system 400 and/or system 600.

Figure 7:
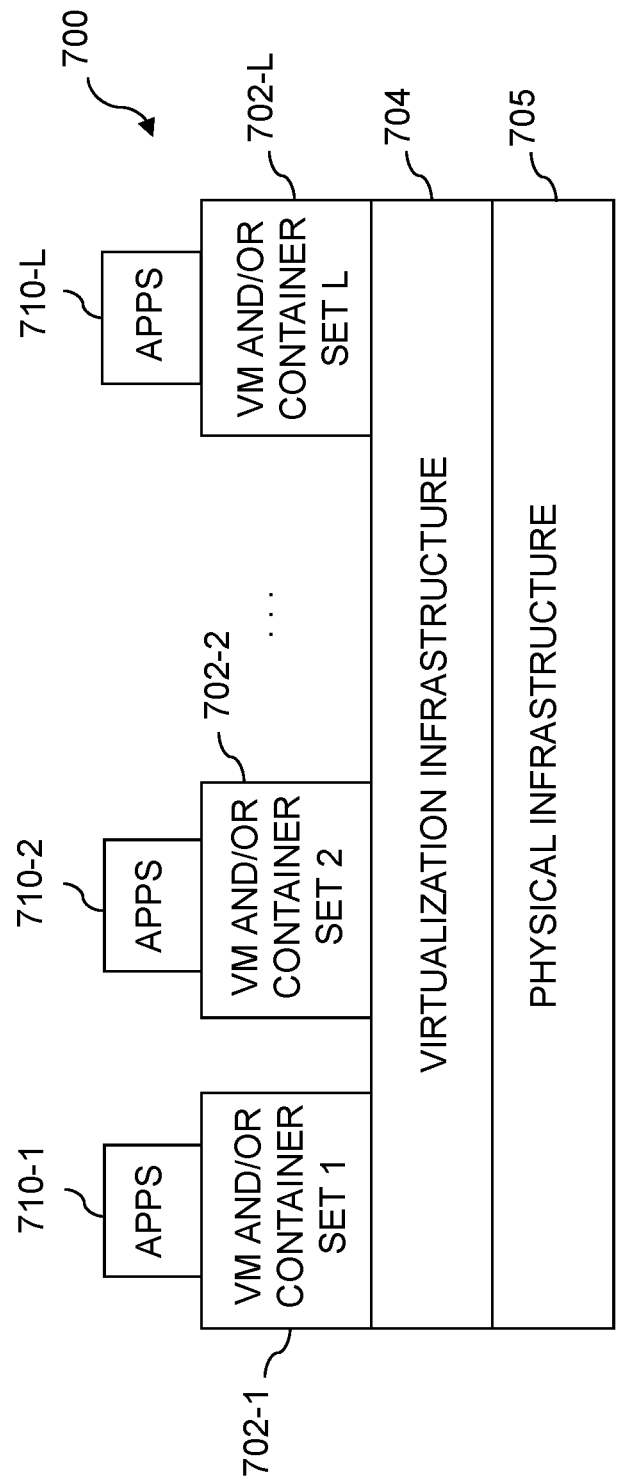
FIGS. 7 and 8 show examples of processing platforms that may be utilized to implement at least a portion of an information processing system in illustrative embodiments.
Figure 8:
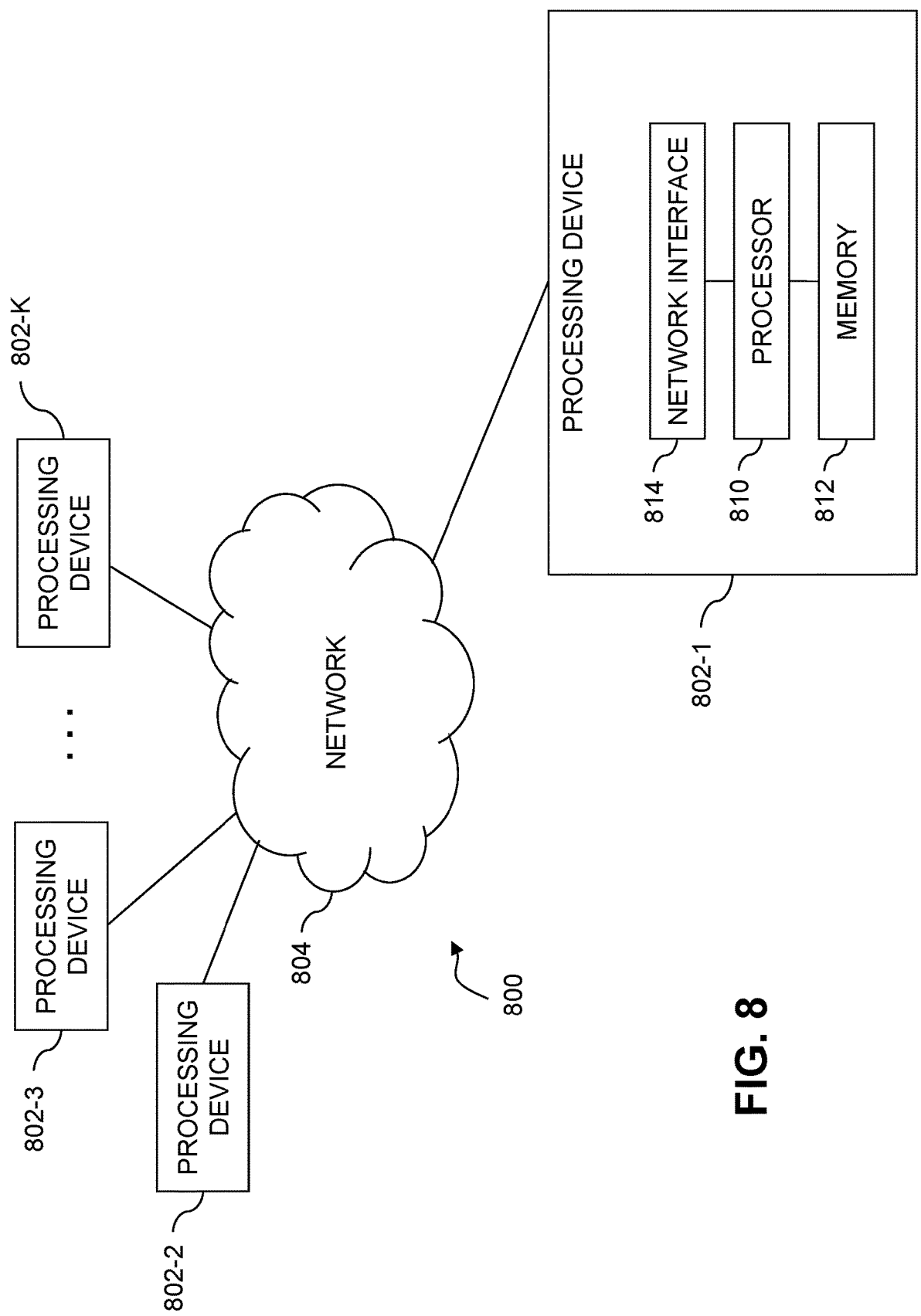

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2 . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2 . . . 710-L running on respective ones of the VMs/container sets 702-1, 702-2 . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide at least portions of the disclosed authentication functionality in an information processing system of the type described above using one or more processes running on a given one of the VMs. For example, each of the VMs can implement logic instances and/or other components providing authentication functionality in the system 100.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed authentication functionality in an information processing system of the type described above. For example, a container host device supporting multiple containers of one or more container sets can implement logic instances and/or other components providing authentication functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the authentication functionality provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, networks, network devices, servers, controllers and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to identify a plurality of components of a first network device;
   to generate at least one fingerprint based at least in part on the identified plurality of components of the first network device;
   to encrypt the at least one fingerprint;
   to generate at least one packet containing at least the encrypted at least one fingerprint;
   to send the at least one packet to at least a second network device; and
   to interact with the second network device to obtain at least one key, wherein interacting with the second network device comprises receiving, in the first network device from the second network device, an additional packet containing an encrypted at least one additional fingerprint generated by the second network device based at least in part on an identified plurality of components of the second network device, and receiving, in the first network device from the second network device, at least one token generated by the second network device, wherein the at least one key is generated by the first network device based at least in part on the at least one additional fingerprint and the at least one token;
   wherein the at least one key is utilized in an authentication process carried out between the first network device and the second network device.

2. The apparatus of claim 1 wherein the at least one processing device comprises at least a portion of the first network device.

3. The apparatus of claim 1 wherein encrypting the at least one fingerprint comprises encrypting the at least one fingerprint utilizing a vendor key that is common to the first and second network devices.

4. The apparatus of claim 1 wherein encrypting the at least one fingerprint comprises encrypting the at least one fingerprint and encrypting additional information characterizing the identified plurality of components.

5. The apparatus of claim 4 wherein the encrypted at least one fingerprint and the encrypted additional information characterizing the identified plurality of components are incorporated into at least one payload of the at least one packet that is sent to at least the second network device.

6. The apparatus of claim 1 wherein the at least one packet comprises at least one Link Layer Discovery Protocol (LLDP) packet.

7. The apparatus of claim 1 wherein the first network device comprises a first proxy management agent that is configured to communicate with a second proxy management agent of the second network device and with a cloud management portal.

8. The apparatus of claim 7 wherein the first network device is configured to exchange workload data with the second network device via their respective proxy management agents.

9. The apparatus of claim 7 wherein one of the first and second proxy management agents of the respective first and second network devices is at least temporarily designated as a primary proxy management agent and the other one of the first and second proxy management agents of the respective first and second network devices is at least temporarily designated as a secondary proxy management agent, based at least in part on relative workloads of the respective first and second network devices.

10. The apparatus of claim 1 wherein the authentication process comprises a multi-factor authentication process and a first factor of the multi-factor authentication process comprises verifying that each of the first and second network devices has access to the same at least one key.

11. The apparatus of claim 10 wherein a second factor of the multi-factor authentication process comprises randomly selecting one of a plurality of other network devices, sending a passcode from one of the first and second network devices to the selected one of the other network devices, and verifying that the other one of the first and second network devices can obtain the passcode from the selected one of the other network devices.

12. The apparatus of claim 11 wherein randomly selecting one of the plurality of other network devices comprises selecting based at least in part on a seed value generated by one of the first and second network devices and communicated from that one of the first and second network devices to the other one of the first and second network devices.

13. The apparatus of claim 10 wherein verifying that each of the first and second network devices has access to the same at least one key comprises encrypting the at least one key in the first network device, and sending the encrypted at least one key from the first network device to the second network device, wherein the second network device decrypts the received encrypted at least one key, and utilizes a result thereof to determine if the first factor is satisfied.

14. A computer program product comprising a non-transitory processor-readable storage medium having stored therein program code of one or more software programs, wherein the program code when executed by at least one processing device causes the at least one processing device:
to identify a plurality of components of a first network device;
to generate at least one fingerprint based at least in part on the identified plurality of components of the first network device;
to encrypt the at least one fingerprint;
to generate at least one packet containing at least the encrypted at least one fingerprint;
to send the at least one packet to at least a second network device; and
to interact with the second network device to obtain at least one key, wherein interacting with the second network device comprises receiving, in the first network device from the second network device, an additional packet containing an encrypted at least one additional fingerprint generated by the second network device based at least in part on an identified plurality of components of the second network device, and receiving, in the first network device from the second network device, at least one token generated by the second network device, wherein the at least one key is generated by the first network device based at least in part on the at least one additional fingerprint and the at least one token;
wherein the at least one key is utilized in an authentication process carried out between the first network device and the second network device.

15. The computer program product of claim 14 wherein encrypting the at least one fingerprint comprises encrypting the at least one fingerprint utilizing a vendor key that is common to the first and second network devices.

16. The computer program product of claim 14 wherein the authentication process comprises a multi-factor authentication process and a first factor of the multi-factor authentication process comprises verifying that each of the first and second network devices has access to the same at least one key.

17. A method comprising:
identifying a plurality of components of a first network device;
generating at least one fingerprint based at least in part on the identified plurality of components of the first network device;
encrypting the at least one fingerprint;
generating at least one packet containing at least the encrypted at least one fingerprint;
sending the at least one packet to at least a second network device; and
interacting with the second network device to obtain at least one key, wherein interacting with the second network device comprises receiving, in the first network device from the second network device, an additional packet containing an encrypted at least one additional fingerprint generated by the second network device based at least in part on an identified plurality of components of the second network device, and receiving, in the first network device from the second network device, at least one token generated by the second network device, wherein the at least one key is generated by the first network device based at least in part on the at least one additional fingerprint and the at least one token;
wherein the at least one key is utilized in an authentication process carried out between the first network device and the second network device; and
wherein the method is performed by at least one processing device comprising a processor coupled to a memory.

18. The method of claim 17 wherein encrypting the at least one fingerprint comprises encrypting the at least one fingerprint utilizing a vendor key that is common to the first and second network devices.

19. The method of claim 17 wherein the authentication process comprises a multi-factor authentication process and a first factor of the multi-factor authentication process comprises verifying that each of the first and second network devices has access to the same at least one key.

20. The method of claim 19 wherein a second factor of the multi-factor authentication process comprises randomly selecting one of a plurality of other network devices, sending a passcode from one of the first and second network devices to the selected one of the other network devices, and verifying that the other one of the first and second network devices can obtain the passcode from the selected one of the other network devices.

* * * * *